United States Patent Office
3,799,840
Patented Mar. 26, 1974

3,799,840
METHOD FOR PRODUCING CITRIC ACID
Hideo Fukuda, Osaka, Takashi Suzuki, Kakogawa, Shunichi Akiyama, Kyoto, and Yasuhiro Sumino, Kobe, Japan, assignors to Takeda Chemical Industries, Ltd., Osaka, Japan
No Drawing. Continuation-in-part of application Ser. No. 5,151, Feb. 22, 1970, now Patent No. 3,689,359. This application Aug. 14, 1972, Ser. No. 280,206
Claims priority, application Japan, Jan. 22, 1969, 44/4,527
The portion of the term of the patent subsequent to Sept. 5, 1989, has been disclaimed
Int. Cl. C12b 1/00
U.S. Cl. 195—28 R     8 Claims

ABSTRACT OF THE DISCLOSURE

This invention relates to a method for producing citric acid which involves inoculating a citric acid-accumulating yeast belonging to the genus Candida, capable of utilizing hydrocarbons and incapable of utilizing citric acid in an aqueous culture medium containing, as the main carbon source, at least one normal paraffin containing 9 to 20 carbons in the molecule; incubating the culture until citric acid is substantially accumulated in the culture broth; and recovering the thus accumulated citric acid therefrom. The invention also relates to a method for selection of Candida yeasts which produce citric acid in the above process, yet which are incapable of utilizing the citric acid once produced.

---

This application is a continuation-in-part of Ser. No. 5,151 filed Jan. 22, 1970, now U.S. Pat. No. 3,689,359.

This invention relates to a method for producing citric acid.

More particularly, this invention relates to a method for producing citric acid which comprises inoculating a citric acid-accumulating yeast belonging to the genus Candida, capable of utilizing hydrocarbons and incapable of utilizing citric acid in an aqueous culture medium containing, as the main carbon source, at least one normal paraffin containing 9 to 20 carbon atoms in the molecule; incubating the culture at a pH of from about 2 to about 10.5 until citric acid is substantially accumulated in the culture broth; and recovering the so-accumulated citric acid therefrom.

This invention also relates to a process for selection and isolating of yeasts of the genus Candida which give outstanding yields of citric acid.

Citric acid is in great demand and is used, for example, as an acidulant in beverage and in pharmaceutical syrups.

Regarding the production of citric acid by fermentation, processes involving the use of microorganisms such as the molds belonging to the genera Penicillium, Aspergillus, etc. are well known and have been the subjects of numerous reports and patents. Those processes, however, invariably depend upon the employment of sugars and other expensive carbon sources, and the fermentation period involved is as long as 5 to 12 days.

On the other hand, it has been disclosed that various yeasts have the ability of accumulating citric acid in a medium containing hydrocarbons.

These yeasts, however, consume gradually the citric acid once produced with the elapse of fermentation time and the final yield depends upon the balance of production and consumption of citric acid.

It is for this reason that the yield of citric acid relative to the carbon sources used has never been as satisfactory as desired.

The present inventors have long engaged in the studies of the metabolism of Candida species and have succeeded in the isolation of certain mutants which lack the ability to utilize citric acid and are capable of utilizing hydrocarbons to produce and accumulate citric acid in a good yield. The present invention is a result of the above studies.

These species are thought to engage in unique metabolic pathways other than the classic TCA cycle. It previously had been thought necessary for yeasts to participate in this cycle when producing citric acid from normal paraffins in order to provide the necessary energy for various metabolic functions.

As stated in Biochemical Engineering, pp. 61 and 62 (1965), energy (to conduct metabolic functions) is derived from the operation of the TCA cycle during reoxidation of the reduced hydrogen carriers and that the cycle would halt quickly if the hydrogen carriers were not reoxidized.

Following schema indicates the knowledge over citric acid pathway which has been made clear up to now. Citric acid is an intermediate substance in the fundamental metabolic cycle (TCA) in microorganisms and while the cycle ordinarily works in a clockwise direction, the energy for microbiological activities is accumulated in a body of organisms and citric acid is transformed into the other organic acids such as oxaloacetic acid, which forms a starting material, together with acetyl CoA for the reproduction of citric acid, thereby completing the cycle.

In the present invention, however, the employed organisms are incapable of utilizing citric acid, indicating that some steps enroute from citric acid to oxaloacetic acid are severed.

Then, the organisms will lose the supplying source of citric acid if the general assumption applies to the present microorganisms (see route (I) in the schema). In case of employing carbohydrates as a carbon source, another route is known in which oxaloacetic acid is reproduced from Pyruvic acid by a fixation of $CO_2$ (see route (II) in the schema), thus even if the route from citric acid to oxaloacetic acid is severed, the organism will reproduce citric acid by this second pathway (II).

In the present invention the carbon source is normal paraffines, in the metabolism of which said second route has not been found (see route (III) in the schema).

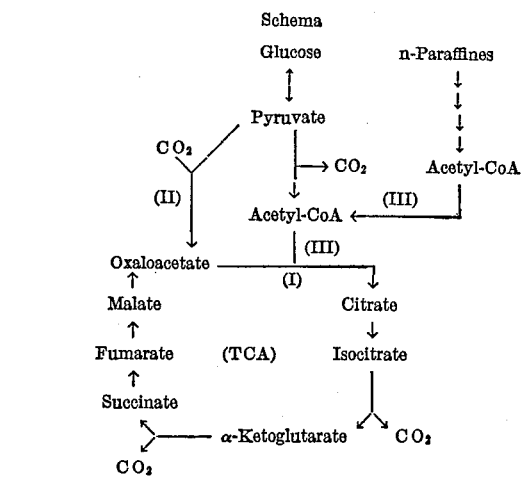

Schema

There must be an unknown third route by which the present microorganisms synthesize oxaloacetic acid and conduct their metabolic functions. Thus the present invention is made totally outside the general knowledge in this field.

Production of citric acid by the method of this invention offers many advantages.

In the first place, the yield is extremely high. It is believed that this improved yield comes from the suppression of production of other organic acids, mainly isocitric acid which would otherwise be produced almost to an amount as large as citric acid on consumption of the objective citric acid. The second advantage of this method is in that the fermentation comes to an end in a relatively short time. Thirdly, it is extremely easy to determine the timing of harvest and the fermentation can be carried out without worrying about overfermentation, since the citric acid once produced is not consumed by the organism. These are considerable advantages in fermentation control. Furthermore, because of the unusually low-concentrations of other organic acids formed as by-products, the isolation of citric acid in a purified form from the culture is greatly facilitated. According to the present invention, the ratio of citric acid to isocitric acid is usually not lower than 9:1.

Thus, the main object of the present invention is to provide a method for producing citric acid in a good yield.

The other object of the present invention is to facilitate the fermentation control and purification procedure of the objective citric acid.

These objects are realized by inoculating a citric acid-accumulating yeast belonging to the genus Candida, capable of utilizing hydrocarbons and incapable of utilizing citric acid in an aqueous culture medium containing, as a main carbon source, at least one normal paraffin containing 9 to 20 carbon atoms in the molecule; incubating the culture at a pH of from about 2 to about 10.5 until citric acid is substantially accumulated in the culture broth; and recovering the so-accumulated citric acid therefrom.

As the parent strains, from which the aforesaid mutants of the genus Candida can be derived, there may be exemplified such yeasts as *Candida lipolytica, Candida parapsilosis, Candida brumptii, Candida intermedia, Candida tropicalis, Candida guilliermondii*, etc., as well as certain yeasts isolated in nature.

Spontaneous or induced mutation is taken advantage of to derive the desired mutuants which are incapable of utilizing citric acid and capable of utilizing the above-mentioned hydrocarbons as a sole carbon source to produce citric acid. For the mutation, such means may be taken as ultraviolet radiation, $Co^{60}$ treatment, X-ray and other high energy radicals, or chemical treatment with mutagens such as $NaNO_2$, $H_2O_2$, N-methyl-N'-nitro-N-nitroso guanidine, acryflavine and the like.

The yeast to be utilized may be selected by culturing hydrocarbon-assimilating, citric acid-accumulating candidate yeasts on a medium containing citric acid and/or its salt as a sole carbon source and isolating a yeast which does not exhibit growth on the said medium.

In the present invention, when an organism does not grow any more under such conditions as specified below, the organism is defined as "lacking in ability of utilizing citric acid," although there is still a chance of its growing on further incubation.

(1) Medium:

| | Percent |
|---|---|
| Trisodium citrate | 0.05 |
| $NH_4NO_3$ | 0.1 |
| $NH_4Cl$ | 0.1 |
| $KH_2PO_4$ | 0.1 |
| $MgSO_4 \cdot 7H_2O$ | 0.05 |
| Agar | 2.2 |

Necessary nutrients such as vitamins, amino acids, and nucleic acid constituents, are added thereto in case the microorganisms require such substances for their growth.

pH 6.5

(2) Cultural conditions: incubated at 28° C. for 2 days.

The following experiment was conducted to examine citric acid productivity of yeasts which were selected by various techniques, including that of the present invention:

(1) Methods and materials:
(1) Parent strains, selection treatments:

| Parent | Experiment 1<br>*Candida lipolytica*<br>ATCC (20114) | Experiment 2<br>*Candida tropicalis*<br>IFO 0589 | Experiment 3<br>*Candida albicans*<br>IFO 1389 |
|---|---|---|---|
| Group: | | | |
| A[1] | Mono cell isolation. | Mono cell isolation. | Mono cell isolation. |
| B | N-methyl-N'-nitro-N-nitrosoguanidine (NTG) treatment.[2] | Ultraviolet ray irradiation. | Ultraviolet ray irradiation. |
| C | Selection by the method of present invention. | Selection by the method of present invention. | Selection by the method of present invention. |

[1] Control.
[2] Microbial cells are suspended in a NTG aqueous solution (250 γ/ml. of NTG) and kept for one minute.

(2) Media:

Medium for the selection of Group A and Group B strains; yeast extract (0.3%), glucose (1%), malto-extract (0.3%), peptone (0.5%), agar (2.0%) and water, (pH 5–6)

Medium for the selection of Group C strains; $NH_4NO_3$ (0.1%), $NH_4Cl$ (0.1%), $KH_2PO_4$ (0.1%), 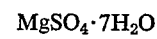$MgSO_4 \cdot 7H_2O$ (0.05%), agar (2.2%), vitamine mixture 1 ml./l. biotin (0.1 μg.), calcium panthothenate (10.0 μg.), folic acid (0.1 μg.), inosital (50.0 μg.), niacin (10.0 μg), paraaminobenzoic acid (5.0 μg.) pyridoxine hydrochloride (10.0 μg.), riboflavin (5.0 μg.) with trisodium citrate (0.05%) or n-paraffines (0.05%) (Control) and water Medium for citric acid production; n-paraffin (8%), $NH_4Cl$ (0.2%), $KH_2PO_4$ (0.01%), $MgSO_4 \cdot 7H_2O$ (0.05%), $MnSO_4 \cdot 7H_2O$ (0.001%), $FeSO_4 \cdot 7H_2O$ (0.001%) dried yeast (0.1%) and $CaCO_3$ (0.5%) and water. On the second and third day 0.5% and 3% of $CaCO_3$ were added, respectively.

(3) Incubation for citric acid production; 28° C., 5 days under aeration and agitation.
(4) Analysis: pentabromoacetone method
(2) Results:

EXPERIMENT 1

| Citric acid productivity (g./l.) | A group | | B group | | C group | |
|---|---|---|---|---|---|---|
| | Number | Percent | Number | Percent | Number | Percent |
| 0–10 | 0 | 0 | 19 | 7.8 | 12 | 5.0 |
| 11–20 | 0 | 0 | 13 | 5.3 | 9 | 3.8 |
| 21–30 | 0 | 0 | 12 | 4.9 | 4 | 1.7 |
| 31–40 | 0 | 0 | 20 | 8.2 | 5 | 2.1 |
| 41–50 | 4 | 2.0 | 38 | 15.6 | 12 | 5.0 |
| 51–60 | 88 | 44.0 | 51 | 21.0 | 33 | 13.9 |
| 61–70 | 92 | 46.0 | 68 | 28.0 | 41 | 17.2 |
| 71–80 | 16 | 8.0 | 21 | 8.6 | 40 | 16.8 |
| 81–90 | 0 | 0 | 1 | 0.4 | 35 | 14.7 |
| 91–100 | 0 | 0 | 0 | 0 | 29 | 12.2 |
| 101–110 | 0 | 0 | 0 | 0 | 17 | 7.1 |
| 111–120 | 0 | 0 | 0 | 0 | 1 | 0.4 |
| Total | 200 | 100 | 243 | 100 | 238 | 100 |

EXPERIMENT 2

| Citric acid productivity (g./l.) | A group Number | A group Percent | B group Number | B group Percent | C group Number | C group Percent |
|---|---|---|---|---|---|---|
| 0–10 | 0 | 0 | 23 | 11.1 | 17 | 7.6 |
| 11–20 | 0 | 0 | 11 | 5.3 | 21 | 9.4 |
| 21–30 | 3 | 1.5 | 26 | 12.5 | 5 | 2.2 |
| 31–40 | 76 | 38.0 | 46 | 22.1 | 38 | 17.0 |
| 41–50 | 83 | 41.5 | 62 | 29.8 | 42 | 18.8 |
| 51–60 | 38 | 19.0 | 37 | 17.8 | 56 | 25.0 |
| 61–70 | 0 | 0 | 3 | 1.4 | 35 | 15.6 |
| 71–80 | 0 | 0 | 0 | 0 | 9 | 4.2 |
| 81–90 | 0 | 0 | 0 | 0 | 1 | 0.4 |
| 91–100 | 0 | 0 | 0 | 0 | 0 | 0 |
| Total | 200 | 100 | 208 | 100 | 224 | 100 |

EXPERIMENT 3

| Citric acid productivity (g./l.) | A group Number | A group Percent | B group Number | B group Percent | C group Number | C group Percent |
|---|---|---|---|---|---|---|
| 0–10 | 0 | 0 | 26 | 11.5 | 16 | 6.9 |
| 11–20 | 85 | 42.5 | 94 | 41.4 | 62 | 26.9 |
| 21–30 | 87 | 43.5 | 81 | 35.7 | 83 | 35.9 |
| 31–40 | 28 | 14.0 | 25 | 11.0 | 38 | 16.4 |
| 41–50 | 0 | 0 | 0 | 0.4 | 25 | 10.8 |
| 51–60 | 0 | 0 | 0 | 0 | 7 | 3.0 |
| 61–70 | 0 | 0 | 0 | 0 | 0 | 0 |
| 71–80 | 0 | 0 | 0 | 0 | 0 | 0 |
| 81–90 | 0 | 0 | 0 | 0 | 0 | 0 |
| 91–100 | 0 | 0 | 0 | 0 | 0 | 0 |
| Total | 200 | 100 | 227 | 100 | 231 | 100 |

(3) Conclusion;

Experiments 1 to 3 demonstrate that microorganisms which were selected by the present invention show a wider distribution in citric acid productivity than those selected by simple mutation or monocell isolation. Besides in case of usual mutation means as in selection of B group, however, the distribution of obtained microorganisms shifted toward the lower productivity. On the other hand, the productivity of C group microorganisms which are unable to utilize citric acid are widely distributed and a high potential strain for the production of citric acid can easily be obtained.

Some of the mutants are devoid of the ability to take citric acid into cells and others require certain nutrients such as various vitamins, amino acids, nucleic acid constituents, etc., and even those mutants may be employed for the purposes of this invention, insofar as they lack in the ability to utilize citric acid and retain the ability to utilize hydrocarbons as a sole carbon source to produce citric acid.

Some of the above mentioned mutants and their microbiological features are shown in Table 1 in comparison with parent strains.

The IFO numbers placed after the yeast employed in the following examples and tables are the respective accession numbers at the Institute for Fermentation, Osaka, Japan.

The various species of the genus Candida utilized in the present invention have been deposited in the American Type Culture Collection in Rockville, Md., U.S.A. The ATCC numbers of the various species contemplated in the instant invention and appearing in the present disclosure and specific examples are as follows:

*Candida lipolytica* L-36—ATCC 20237
Candida sp. H-22—ATCC 20238
Candida sp. FRZ-3—ATCC 20239
*Candida-tropicalis* 9M—ATCC 20240
Candida sp. 164 K-1—ATCC 20241

TABLE 1

| | *Candida lipolytica* IFO 1437 (ATCC 20114) | Candida sp. IFO 1461 | Candida sp. IFO 1462 | *Candida tropicalis* IFO 0589 (ATCC 20115) | Candida sp. 164 IFO 1460 |
|---|---|---|---|---|---|
| Parent strain No. | | | | | |
| Mutant strain No. | *Candida lipolytica* L-36 ATCC 20237 | Candida sp. H-22 ATCC 20238 | Candida sp. FRZ-3 ATCC 20239 | *Candida tropicalis* 9M ATCC 20240 | Candida sp. 164 K-1 ATCC 20241 |
| Malt extract, 25° C, 3 days. | Circular to elliptical; pseudomycelium, truemycelium. | Circular to elliptical; pseudomycelium, truemycelium. | Circular to elliptical, budding; pseudomycelium and truemycelium. | Circular to elliptical, budding; pseudomycelium and truemycelium. | Circular to elliptical, budding; pseudomycelium and truemycelium. |
| Malt slant, 25° C, 3 days. | Elliptical truemycelium. | Elliptical; truemycelium pseudomycelium. | Circular to elliptical, truemtcelium and pseudomycelium. | Circular to elliptical, truemycelium and pseudo mycelium. | Circular to elliptical, truemycelium and pseudomycelium. |
| Malt extract, 25° C., 17 days. | Circular to elliptical, ghost-like, mycelium is fragmented. Dry with wrinkles formed in 2–3 days, no pellicle. | Oval to elliptical, truemycelium, no pellicle formed; yeast ring. | Circular to elliptical, truemycelium, a thin pellicle. | Circular to elliptical, occasionally thin pellicle formed, yeast ring. | Circular to elliptical no pellicle formed, growth on the surface. |
| Malt extract, 25° C., 37 days. | Sediment observed on 17th and 37th days. | Yeast ring liable to be detached; no pellicle. | Yeast ring, sedimentation islet, pellicle, cloudiness of medium. | Yeast ring, no sedimentation, islet, pellicle. | Thin pellicle formed, yeast ring. |
| Malt agar, 17° C., 1 month. | Unclear yellow, wrinkled, dry, medium turning brown. | White to yellow; dry and filmy. | White to yellow; dry and filmy. | Pale yellow or white to yellow, dry, liable. | Torbid yellow, slightly wrinkled, wet. |
| Fermentation: | | | | | |
| Glucose | − | + | + | + | − |
| Galactose | − | + | + | + | − |
| Maltose | − | + | + | + | − |
| Lactose | − | − | − | ± | − |
| Sucrose | − | ±~+ | ±~+ | + | − |
| Assimilation: | | | | | |
| Glucose | + | + | + | + | + |
| Galactose | − | + | + | + | ± |
| Maltose | − | + | + | + | ± |
| Lactose | − | − | − | − | − |
| Sucrose | − | + | + | + | − |
| Utilization of potassium nitrate. | − | − | − | − | − |
| Litmus milk | Peptonized | Blue | Blue | Blue | Blue. |
| Decomposition of escurin. | ± | + | + | + | + |
| Acid production | + | + | + | + | − |

The medium to be employed in the method of this invention should be slightly modified according to the particular mutants to be used, but such normal alkanes of 9 to 20 carbons in the molecule as n-nonane, n-undecane, n-dodecane, n-tetradecane, n-pentadecane, n-hexadecane, n-heptadecane, n-octadecane, n-nonadecane, n-eicosane, etc., as well as their mixtures, and such petroleum oil fractions as gas oil, heavy gas oil, kerosene, etc. may be utilized as carbon sources to advantage.

The hydrocarbons are generally used in such an amount of the normal paraffin(s) with 9 to 20 carbon atoms in the molecule as about 3 to 20% (volume/volume) in the culture medium.

As these hydrocarbons are scarcely soluble in water, the addition to an aqueous culture medium is practically carried out under stirring or shaking to prepare a suspension containing very fine particles. If desired, a suspending agent, e.g. a surfactant of the type of polyoxyethylene sorbitan monostearate can be employed.

These hydrocarbons are by themselves satisfactory as carbon sources, but, if desired, commonly employable carbon sources such as carbohydrates (e.g. glucose) can be used together with the hydrocarbons.

As the necessary nitrogen sources, use may be made of various inorganic ammonium salts such as $NH_4Cl$, $(NH_4)_2SO_4$, $(NH_4)_2HPO_4$, $NH_4OH$, $NH_4NO_3$, etc., urea, the ammonium salts of various organic acids, e.g. ammonium acetate, and organic nitrogenous materials such as dried yeast, yeast extract, meat extract, fish meal, soybean flour, corn steep liquor, peptone, distiller's waste and the like. Those nitrogen sources may be used either singly or in combination.

In addition to such carbon and nitrogen sources, the medium to be employed may further contain, if required, any of those inorganic salts which are commonly employed, e.g. the salts of iron, manganese, magnesium, calcium and various nutrients which might be necessary for the growth of the mutant.

The pH of the medium may be selected from the wide range which permits growth of the mutants employed, and generally the range of pH 2 to pH 10 or preferably pH 2 to pH 7 and particularly pH 3 to pH 6, is most preferred. If, in the course of cultivation, a drop in pH occurs by citric acid produced, it is advisable to adjust the pH of the medium from time to time within the aforesaid range while continuing the cultivation. For this purpose, the cultivation may be conducted with an occasional addition of a neutralizer which may, for example, be $CaCO_3$, $Ca(OH)_2$, $NH_4OH$, $NaOH$ or $Na_2CO_3$. Alternatively, in order to give an adequate buffering action to the medium, $CaCO_3$, for one, may be preliminarily added in an amount according to the possible pH drop.

The incubation temperature may vary somewhat depending upon the particular mutant employed, and generally be within the range of 20° to 35° C., particularly of 25° to 30° C. Since the method of this invention is generally carried out under aerobic conditions, a stirring cultural method involving the use of a tank is suitable for the purpose. In this connection, if defoaming is required, it is advisable to add such known defoaming agents as polyoxypropylene derivatives, soybean oil, silicone oil, lard oil, etc.

Thus accumulated citric acid in the culture broth is recovered by applying per se conventional means such as filtration, centrifugation, heating, precipitation, crystallization, decolorization and drying, and column-chromatography can be carried out either singly or in combination. If the case demands, the pH of the culture broth is adjusted. By way of illustration, when there exists insoluble calcium citrate in the culture broth, it is desirable to acidify the broth with hydrochloric acid to solubilize the said salt, followed by further separation procedure.

If desired, after being separated from yeast cells, the culture liquid is neutralized with sodium hydroxide, calcium carbonate, milk of lime, or the like. The thus-obtained solution is kept standing at room temperature (about 15° to about 30° C.) or under heating, followed by filtration or centrifugation and drying to give calcium citrate as white powder. The powder is, if required, further purified by per se conventional means such as neutralization, etc.

If the powder is a mixture of citric acid and (+)-isocitric acid, the separation may be effected, for instance, by the following means.

The powder dissolved in hot water is subjected to suction-filtration, while hot, to obtain calcium salts of citric acids, followed by neutralization and filtration. The filtrate is concentrated to a syrup state and then subjected to column chromatography on silica gel utilizing an n-butanol-chloroform mixture as an eluting solvent, whereby citric acid and (+)-isocitric acid flow down into different fractions.

Citric acid and (+)-isocitric acid are respectively measured by the pentabromoacetone method (Seikagaku 27 72 (1955)) and by the enzymatic method (Methods of Enzymatic Analysis (Verlag Chemie) 318, Günther Siebert).

Presently-preferred embodiments of the invention are shown in the following examples, but they are not intended to be construed as a limitation of the present invention. Throughout the specification, percentages are calculated on the weight per volume basis, and yields are calculated on the weight of produced citric acid per weight of consumed normal paraffins.

The relationship between part(s) by weight and part(s) by volume is the same as that between gram(s) and milliliter(s).

EXAMPLE 1

A culture of Candida lipolytica L–36 (ATCC 20237) which has been derived from Candida lipolytica IFO 1437 is used to inoculate in 10 parts by volume of a sterilized aqueous medium (pH 6.0) which contains a hydrocarbon mixture composed predominantly of n-paraffin having 13 to 15 carbon atoms (2%), $NH_4Cl$ (0.2%), $KH_2PO_4$ (0.05%), $MgSO_4 \cdot 7H_2O$ (0.05%, $MnSO_4 \cdot 7H_2O$ (0.001%), $FeSO_4 \cdot 7H_2O$ (0.001%), and $CaCO_3$ (0.5%) then incubated at 28° C. under agitation and aeration for 48 hours. 10 parts by volume of the resulting pre-culture is transferred to 100 parts by volume of a medium containing n-paraffin (6%) (same as above), $NH_4Cl$ (0.2%), $KH_2PO_4$ (0.01%), $MgSO_4 \cdot 7H_2O$ (0.05%), $MnSO_4 \cdot 7H_2O$ (0.001%), $FeSO_4 \cdot 7H_2O$ (0.001%), dried yeast (0.1%) and $CaCO_3$ (0.5%), and the inoculated medium is incubated at 28° C. under aeration and agitation. On the second day $CaCO_3$ (0.5%) and on the third day $CaCO_3$ (3%) are aseptically added to adjust the pH of the medium, and the cultivation is continued for a total of 5 days. The yields of citric acid produced and accumulated in the broth and of isocitric acid, which occurs in the highest concentration of all by-product organic acids, are shown below, along with the corresponding yields attainable by the cultivation of the parent strain.

|  | Citric acid | | Isocitric acid | |
| --- | --- | --- | --- | --- |
|  | Yield, mg./ml. | Percent yield relative to carbon source | Yield, mg./ml. | Percent yield relative to carbon source |
| Parent strain | 22.8 | 38 | 27 | 45 |
| Mutant | 69.8 | 115.4 | 1.36 | 2.1 |

A portion of the above culture is further incubated for 3 days, or a total of 8 days, at the end of which time the accumulation of citric acid by the mutant strain has reached 69.1 mg./ml. In contrast, the accumulation by the parent strain rather drops to 13.2 mg./ml.

On the 5th day of cultivation, 100 parts by volume of the culture is taken and adjusted to pH 2.0 by the addition of 3 N-HCl, followed by centrifugation to remove the cells. The supernatant fluid is adjusted to pH 6.8 with 5 N-NaOH and heated at 100° C. for 30 minutes. After cooling the fluid, the sediment is recovered by filtration and allowed to dry in a stream of air. The procedure yields calcium citrate which contains 6.3 parts by weight of citric acid. The salt is suspended in 40 parts by volume of water and neutralized with 5 N-$H_2SO_4$.

To the supernatant fluid is added 1 part by weight of activated carbon, followed by filtration.

The resulting filtrate is concentrated under reduced pressure until a syrup of low consistency is obtained. (If calcium hydroxide precipitates, they are filtered off in the course of concentration). The concentrate is allowed to stand in a refrigerator, whereupon 5.7 parts by weight of crystals of citric acid (as citric anhydride) are obtained.

EXAMPLE 2

A citric acid non-utilizing mutant H–22 (ATCC 20238) derived from Candida sp. IFO 1461 (the above mutant has a non-L-lactic acid utilizing property as well) is used to inoculate 100 parts by volume of a sterilized medium (pH 6.5) containing a n-paraffin mixture (8%) having 12 to 18 carbon atoms (purity 92%), $NH_4Cl$ (0.3%), $KH_2PO_4$ (0.01%), $MgSO_4 \cdot 7H_2O$ (0.05%), $FeSO_4 \cdot 7H_2O$ (0.05%) and $CaCO_3$ (0.5%). The whole are incubated at 28° C. for 3 days, with $NH_4OH$ (14% solution) being added from time to time so as to maintain the yellowish green color of the medium (i.e. between pH 4 and pH 5). The results are shown below, along with the results attainable by use of the parent organism.

|  | Citric acid[1] | | Isocitric acid | |
| --- | --- | --- | --- | --- |
|  | Yield, mg./ml. | Percent yield relative to carbon source | Yield, mg./ml. | Percent yield relative to carbon source |
| Parent organism | 49 | 61.2 | 52 | 65 |
| Mutant | 112 | 138 | 1.3 | 1.7 |

[1] The most abundant by-product.

A portion of the above culture is further incubated for 2 days, at the end of which time the yield of citric acid by the mutant is 109 mg./ml. It is worthy of note that the corresponding figure for the parent strain is as low as 25.4 mg./ml.

On the third day, the above culture is collected and filtered to remove the organisms. The filtrate is adjusted to pH 7.0 by the addition of $Ca(OH)_2$ and boiled under slightly reduced pressure for 30 minutes. After cooling, the sediment is recovered by filtration and treated in the same manner as Example 1. The procedure yields 9.3 parts by weight of (as citric anhydride) crystals of citric acid.

EXAMPLE 3

Candida sp. FRZ-3 (ATCC 20239), derived from Candida sp. IFO 1462, is cultivated in the same manner as in Example 2, and on the third day of cultivation, the culture is analyzed for citric acid and by-product isocitric acid. The results are shown below.

|  | Citric acid | | Isocitric acid | |
| --- | --- | --- | --- | --- |
|  | Yield, mg./ml. | Percent yield relative to carbon source | Yield, mg./ml. | Percent yield relative to carbon source |
| Parent organism | 31.5 | 39.4 | 39 | 48.7 |
| Mutant | 86 | 107.5 | 0.8 | 1.0 |

The above culture is further incubated for 3 days, at the end of which time the yield of citric acid by the mutant is 84 mg./ml. or substantially unchanged from the figure on the 3rd day. In contrast, the yield by the parent organism drops to 19 mg./ml.

On the 3rd day of cultivation, 100 parts by volume of the culture of the mutant is collected and treated by the procedure described in Example 2, whereupon 7.4 parts by weight of (as citric anhydride) crystals of citric acid are obtained.

EXAMPLE 4

Candida sp. K–1 (ATCC 20241) (derived from Candida sp. 164 IFO 1460) and Candida tropicalis 9M (ATCC 20240) (derived from Candida tropicalis (IFO 0589) are cultivated in the same manner as in Example 2 and one the third day of cultivation, the cultures are analyzed for citric acid and isocitric acid.

The results are shown below in comparison with those of their parents.

|  | Citric acid | | Isocitric acid | |
| --- | --- | --- | --- | --- |
|  | Yield, mg./ml. | Percent yield relative to carbon source | Yield, mg./ml. | Percent yield relative to carbon source |
| Candida sp. K-1 ATCC 20241 | 81 | 100.1 | 9 | 11.2 |
| Candida sp. 164 (IFO 1460) | 32 | 30 | 16 | 20 |
| Candida tropicalis 9M ATCC 20240 | 88 | 110 | 2 | 2.5 |
| Candida tropicalis (IFO 0589) | 46 | 57.5 | 32 | 40 |

EXAMPLE 5

A loopful of a slant culture of Candida lypolitica IFO 1463 (ATCC 20237) is used to inoculate a sterilized creased flask of 200 ml. capacity containing 40 ml. of a seed culture medium (pH 6.0) composed of a mixture of n-paraffins of 12 to 15 carbon atoms (commercial product) (20%), $NH_4Cl$ (0.2%), $KH_2PO_4$ (0.05%), dry yeast (0.1%), $MgSO_4 \cdot 7H_2O$ (0.05%), $MnSO_4 \cdot nH_2O$ (0.001%), $FeSO_4 \cdot 7H_2O$ (0.001%) and $CaCO_3$ (0.5%). The flask is incubated on a shaker at 28° C. and 200 r.p.m. for 48 hours. A 2 ml. portion of the resulting preculture is used to inoculate 200 ml. creased flasks containing 20 ml. of a fermentation medium composed of a n-paraffin mixture (same as used above) (6% (w./v.)), $(NH_4)_2SO_4$ (0.3%), $MgSO_4 \cdot 7H_2O$ (0.03%), $FeSO_4 \cdot 7H_2O$ (0.001%), $CaCl_2$ (0.1%), $KH_2PO_4$ (0.02%), thiamine (0.05 p.p.m.) and bromocresol purple (10 p.p.m.) (pH of medium, 6.0 tap water added). The flasks are incubated on a shaker at 28° C. and 200 r.p.m. for 3 days. In the meantime, the color change of bromocresol purple is constantly watched and, accordingly, the pH is maintained in the range of pH 4.0 to 7.0. In this process, (a) a 20% aqueous solution of sodium carbonate, and (b) a 20% aqueous solution of sodium hydrogen carbonate are respectively added in the same way. On the third day of incubation, the citric acid contained in each of the broths is determined. It is found that, per hundred milliliters of broth, citric acid has been accumulated in the following amounts. (a) 8.4 g., and (b) 8.0 g. In the cases of (a) and (b), the yields as sodium citrate are as high as 9.3 g. and 8.8 g., respectively. In this example, the amount of carbonate added in (a) and (b) corresponds to 0.6 moles.

We claim:

1. A method for producing citric acid which comprises inoculating a citric acid-accumulating yeast belonging to the genus Candida, capable of utilizing hydrocarbons and incapable of utilizing citric acid in an aqueous culture medium containing, as the main carbon source, at least one normal paraffin containing 9 to 20 carbon atoms in the molecule; incubating the culture until citric acid is substantially accumulated in the culture broth at a ratio of citric acid to isocitric acid of not lower than 9:1 and recovering so-accumulated citric acid therefrom.

2. A method according to claim 1, wherein the incubation temperature is between 20° and 35° C.

3. A method according to claim 1, wherein the pH of culture medium is kept between 2 and 10.5.

4. A method according to claim 1, wherein the pH of culture medium is kept between 2 and 7.

5. A method according to claim 1, wherein the pH of culture medium is kept between 3 and 6.

6. A method according to claim 1, wherein the yeast is *Candida lipolytica*.

7. A method according to claim 1, wherein the yeast is *Candida tropicalis*.

8. A method according to claim 1, wherein said yeast is selected by culturing hydrocarbon-assimilating, citric acid-accumulating candidate yeasts on a medium containing citric acid and/or its salt as a sole carbon source and isolating a yeast which does not exhibit growth on the said medium.

References Cited

UNITED STATES PATENTS 3,689,359   9/1972   Fukuda et al. ___ 195—28 R

FOREIGN PATENTS 1,211,246   11/1970   Great Britain ___ 195—30

A. LOUIS MONACELL, Primary Examiner

R. B. PENLAND, Assistant Examiner